United States Patent [19]

Simpson

[11] Patent Number: 4,704,707
[45] Date of Patent: Nov. 3, 1987

[54] ELECTROSTATIC RANDOM ACCESS MEMORY

[75] Inventor: George R. Simpson, Westport, Conn.

[73] Assignee: Bos-Knox, Ltd., Tulsa, Okla.

[21] Appl. No.: 854,822

[22] Filed: Apr. 23, 1986

Related U.S. Application Data

[63] Continuation-in-part of Ser. No. 642,752, Aug. 21, 1984, Ser. No. 642,997, Aug. 21, 1984, Ser. No. 642,996, Aug. 21, 1984, Ser. No. 683,619, Dec. 19, 1984, Ser. No. 819,917, Jan. 16, 1986, and Ser. No. 819,918, Jan. 16, 1986.

[51] Int. Cl.⁴ .............................................. G11C 7/00
[52] U.S. Cl. ................................. 365/244; 340/825.79
[58] Field of Search ............... 365/244, 120, 127, 164; 350/266; 340/825.79

[56] References Cited

U.S. PATENT DOCUMENTS 4,235,522 11/1980 Simpson et al. ..................... 350/266
4,248,501 2/1981 Simpson .............................. 350/266

Primary Examiner—Joseph A. Popek
Attorney, Agent, or Firm—Davis Hoxie Faithfull & Hapgood

[57] ABSTRACT

A random access memory array of binary elements each having an electrostatically attractable member moveable with respect to a stator member between positional states representative of first and second binary digits. Which positional state an element is in is ascertainable by further movement capability of only those elements which are in the state representative of the second binary digit.

15 Claims, 2 Drawing Figures

ELECTROSTATIC RANDOM ACCESS MEMORY

BACKGROUND OF THE INVENTION

This application is a continuation-in-part of our co-pending applications Ser. Nos. 642,752, 642,997, 642,996, filed Aug. 21, 1984, Ser. No. 683,619, filed Dec. 19, 1984 and Ser. Nos. 819,917 and 819,918 filed Jan. 16, 1986 the disclosures of which are hereby incorporated by reference. This application is related to co-pending applications, Ser. No. 854,821 and Ser. No. 854,820, concurrently filed herewith and commonly assigned, the entire disclosures of which are also incorporated by reference.

This invention relates to electrostatically controllable electromechanical binary devices for use as an array in visual displays, switching matrices, memories, and the like.

The prior art contains various examples of electrostatic display elements. One type of device such as is shown in U.S. Pat. Nos. 1,984,683 and 3,553,364 includes light valves having flaps extending parallel with the approaching light, with each flap electrostatically divertable to an oblique angle across the light path for either a transmissive or reflective display. U.S. Pat. No. 3,897,997 discloses an electrode which is electrostatically wrapped about a curved fixed electrode to affect the light reflective character of the fixed electrode. Further prior art such as is described in ELECTRONICS, 7 Dec. 1970, pp. 78-83, and I.B.M. Technical Disclosure Bulletin, Vol. 13, No. 3, Aug. 1970, uses an electron gun to electrostatically charge selected portions of a deformable material and thereby alter its light transmissive or reflective properties.

Additional instruction in the area of electrostatically controlled elements usable for display purposes can be gained from the following U.S. patents:

U.S. Pat. No. 4,336,536—Kalt et al
U.S. Pat. No. 4,266,339—Kalt
U.S. Pat. No. 4,234,245—Toda et al
U.S. Pat. No. 4,229,075—Ueda et al
U.S. Pat. No. 4,208,103—Kalt et al
U.S. Pat. No. 4,160,583—Ueda et al
U.S. Pat. No. 4,160,582—Yasuo
U.S. Pat. No. 4,105,294—Peck
U.S. Pat. No. 4,094,590—Kalt
U.S. Pat. No. 4,065,677—Micheron et al
U.S. Pat. No. 3,989,357—Kalt
U.S. Pat. No. 888,241—Kuhlmann The present invention proceeds from material disclosed in Simpson U.S. Pat. Nos. 4,248,501, and Simpson et al 4,235,522, the disclosure of which is incorporated herein by reference.

Of background interest are:

W. R. Aiken: "An Electrostatic Sign -The Distec System," Society for Information Display, June 1972, pp. 108-9;

J. L. Bruneel et al: "Optical Display Device Using Bistable Elements," Applied Physics Letters, Vol. 30, no. 8, 15 Apr. 1977, pp. 382-3, and R. T. Gallagher: "Microshutters Flip to Form Characters in Dot-Matrix Display", Electronics, July 14, 1983, pp. 81-2.

Grandean et al. U.S. Pat. No. 4,383,255 deals with the subject of the above Gallagher article. A plurality of shutters are ganged together to form a bar. A pattern of seven bars can display a numeral. Each bar requires an external lead. More on this subject can be found in "A Novel Electromechanical Microshutter Display" by R. Vuilleumier et al., a typescript not known to be a publication and showing a date "27.9.1983".

SUMMARY OF THE INVENTION

The present invention is concerned with memory arrays and in particular with random access memory (RAM) arrays. RAM arrays comprise a matrix of elements which selectively can be changed from one state to another to represent the binary numbers "one" and "zero". Coordinate addressing is employed to select a particular element for establishing its state (write) and to inquire of the status (read) of a particular element. Location of an element in a two dimensional matrix can be its address in terms of the column and row at which the element is found. The columns and rows can be numerical values for variables such as x, y. According to the present invention the address may comprise more than two dimensions or variables, for example W, X, Y, and Z.

Very early RAM matrix arrays employed torroidal ferrite cores threaded by wires for x, y, and read. The concurrence of electrical current in both the x and the y wires at an x, y intersection could change the magnetic state of the core at that intersection. The early magnetic core memories have been supplanted by other binary electronic devices. The present invention employs electrostatically actuated binary devices as the elements of the RAM matrix.

In accordance with the present invention, a RAM array comprising a matrix of electrostatically actuated binary elements can be changed from one state to the other and the status of each element in the array can be read by electrical signals, optically, or by other means. The electrostatically actuated binary elements each comprise a stator member and a moveable member electrostatically attractable by the stator member. One or both of these two members is provided with a plurality of electrode regions which, when energized, provide the electrostatic attraction force. Suitable electrostatic binary devices are disclosed in U.S. Pat. Nos. 4,235,522 and 4,248,501, and our co-pending applications Nos. 642,752; 642,996; 642,997; 683,619; 819,917; 819,918; 854,82; and 854,820. Therein are disclosed various forms of electrostatically actuated binary devices wherein the moveable member is a flexible foil or conductive film in the form of a curl, shutter, flap, bulge, particle in a fluid, or the like. The electrode regions of those various devices are energized or de-energized sequentially to move the moveable member progressively. Electrode regions serve to retain the moveable member in either of two states. The present invention uses these electrostatic binary devices as the elements of a memory array.

DETAILED DESCRIPTION

A FIRST EMBODIMENT

Although applicable to various forms of electrostatically actuated binary devices, the present invention first will be described in the context of a curled moveable member of the type disclosed in U.S. Pat. Nos. 4,235,522 and 4,248,501. The moveable member therein is a curled film having a conductive coating. Sequential energization of electrode regions on the stator attract the curl and cause it to uncurl to overlie the flat stator. De-energization allows the moveable member to re-curl in response to its mechanical or spring bias which favors curling.

Figure 1:
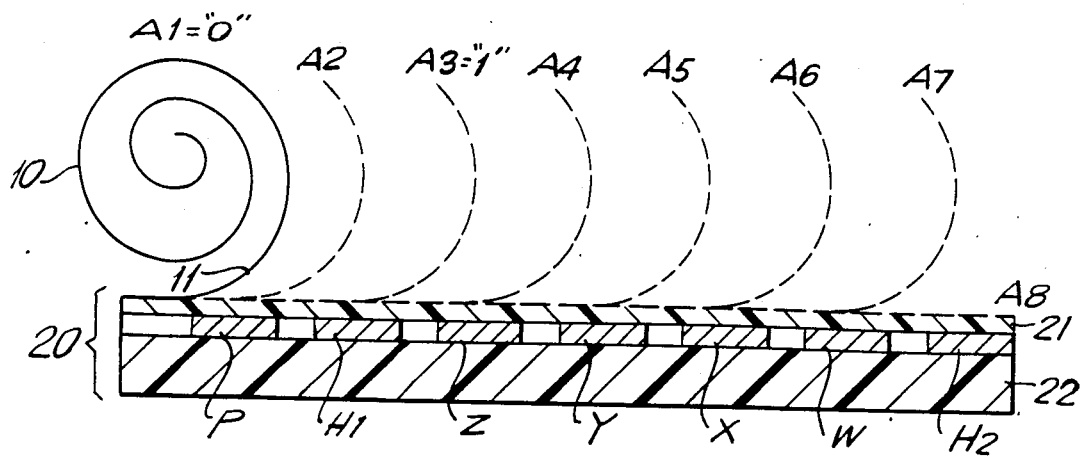
FIG. 1 is a view in cross-section of one electrostatically actuated binary element of a random access memory array of similar elements according to a first embodiment.

FIG. 1 schematically illustrates this curl form of device adapted for use as an element of a RAM array in accord with the present invention.

The moveable member is a curled ribbon 10 of a polymeric film coated with a surface layer 11 of conductive material such as vacuum deposited aluminum or indium-tin oxide. Polyethylene terephthalate (PET) is a suitable film polymer of adequate dielectric properties and is capable of retaining a stress to provide the mechanical bias to cause the member to curl in the fashion of a watch spring.

The stator member 20 comprises a non-conductive substrate 22 having a pattern of electrode regions. For purposes of illustration, the stator electrode regions are designated P, $H_1$, X, Y, Z, W, and $H_2$. An insulation layer 21 electrically separates the conductive coating 11 of the curl 10 from the electrode regions. Alternatively, the coating 11 may be on the side of the film 10 remote from the stator electrodes whereby the film 10 itself acts as the insulation layer. The electrode regions may be formed by printed circuit techniques such as etching or printing in a pattern with conductive ink.

The moveable member or curl 10 is shown in solid lines fully curled to the left in a position designated $A_1$. Intermediate curl positions $A_2$ through $A_7$ are shown in dashed lines as is the fully flattened position $A_8$. To move the curl to the flattened position, it is necessary to energize all stator electrode regions. This is accomplished by sequential energization of the electrode regions progressively from left to right in FIG. 1. Energization of the preliminary electrode region designated P will cause the curl to advance from position $A_1$ to position $A_2$ where the curl 10 is adjacent electrode region $H_1$. Energization of region $H_1$ will advance to curl to position $A_3$ and so forth until it lies flat in position $A_8$ latched in that position by electrode $H_2$. It should be noted that energization of an electrode region remote from a present position of the curl will have no effect for the curl is not in a position to be attracted by that remote electrode. For example, energization of region $H_1$ will not attract the curl 10 unless it was first moved to position $A_2$ by the preliminary electrode P. Further, electrodes behind the curl (to the left in FIG. 1) need not remain energized after they have served to convey the curl to the next energized electrode region.

The foregoing procedure to flatten the curl of an element is employed to store and to retrieve information in a memory array of a large number of elements, each similar to that illustrated in FIG. 1. The information is stored in the form of first and second binary numbers wherein a curl in position $A_1$ represents a binary digit "zero" (or "one") and a curl in position $A_3$ represents the opposite binary "one" (or "zero"). Each and every element of the array has a discrete address in terms of its W, X, Y, and Z coordinates. No two elements share the same complete address although other elements may share some of the address coordinates.

EXAMPLE

To store information (write) in the array, all elements are driven to the flattened condition at position $A_8$ and all are held there by latching electrodes $H_2$. Selected elements now can be addressed to change them to the fully curled position $A_1$ where they represent the binary digit "zero". Elements not selected will assume position $A_3$ where they represent the binary digit "one" TABLE 1 summarizes the sequence for addressing one selected or target element. In the example of TABLE 1 the target element has for discrete address coordinates W=6, X=2, Y=3, Z=5. In TABLE 1 plus (+) indicates energized electrodes and minus (−) indicates de-energized electrodes.

TABLE 1

| STEP | $H_2$ | All W | only $W_6$ | All X | only $X_2$ | All Y | only $Y_3$ | All Z | only $Z_5$ | $H_1$ | P |
|---|---|---|---|---|---|---|---|---|---|---|---|
| 1 | + | + | + | + | + | + | + | + | + | + | + |
| 2 | − | + | + | + | + | + | + | + | + | + | + |
| 3 | − | + | − | + | + | + | + | + | + | + | + |
| 4 | − | + | − | + | − | + | + | + | + | + | + |
| 5 | − | + | − | + | − | + | − | + | + | + | + |
| 6 | − | + | − | + | − | + | − | + | − | + | + |
| 7 | − | + | − | + | − | + | − | + | − | − | + |
| 8 | − | + | − | + | − | + | − | + | − | − | − |
| 9 | − | + | − | + | − | + | − | + | − | + | − |
| 10 | − | − | − | − | − | − | − | − | − | + | − |

At Step 1, all electrodes of the array are energized. Therefore, all elements are at position $A_8$, held there by latching electrode $H_2$.

At Step 2, $H_2$ are de-energized and all elements retreat to position $A_7$.

At step 3, of the W electrodes, only $W_6$ are de-energized. All elements having $W_6$ as an address coordinate retreat to $A_6$.

At Step 4, of the X electrodes, only $X_2$ are de-energized and all elements having $X_2$ as well as $W_6$ as address coordinates retreat to $A_5$.

At Step 5, of the Y electrodes, only $Y_3$ are de-energized and all elements having $Y_3$ as well as $X_2$ and $W_6$ as address coordinates retreat to $A_4$.

At Step 6, of the Z electrodes, only $Z_5$ are de-energized. Since only the target element has $Z_5$ as well as $X_2$, $Y_3$, and $W_6$ as address coordinates, only it retreats to $A_3$.

At Step 7 the target element goes to $A_2$.

At Step 8 the target element goes to $A_1$ where it represents the binary digit "zero".

At Step 9, $H_1$ is energized.

At Step 10, all other electrodes are de-energized. The other elements are released to retreat to position $A_3$ where they represent the binary digit "one".

If additional elements are selected to become binary "zero", steps 2 through 8 are repeated before steps 9 and 10. The electrodes appropriate for the coordinate addresses of each element selected are deenergized. Steps 2 through 8 are described sequentially, but may occur simultaneously. Only the selected elements will curl or retreat to position $A_1$.

The storing (writing) procedure just described recurls the addressed element. Alternatively, the addressed element could be uncurled sequentially to write.

Information is now stored or written in the array in the form of the binary digits "one" and "zero". To retrieve that information (read) without permanently altering the information, the following procedure is used to inquire of the status, "zero" or "one", of a selected element. In other words, the procedure is to inquire whether a particular element is at position $A_3$="1" or at position $A_1$="0". In essence the procedure is to address a particular element to latch at position $A_8$. The element will uncurl to $A_8$ if it was at $A_3$ and will not if it was at $A_1$. The presence or absence of an addressed element at position $A_8$ can be ascertained electrically (as by noting whether or not there was a change in electrical capacitance). Preferably, the presence of an element is sensed optically by the effect of the curl upon light or other radiation. By holding the curl with the W electrode and cycling of the $H_2$ electrode, the end of the curl will flutter, thereby modulating light with the frequency of the cycling of $H_2$. A photocell is used to detect the modulated light. If modulated light is detected, the addressed element represents a binary "one". If not detected, the element represents a binary "zero" condition. Key to the inquiry procedure is the fact that elements at position $A_1$ (zeros) are unaffected by energization of the address electrodes W, X, Y, Z, whereas those elements at position $A_3$ (ones) are susceptible to addressing. The selected electrode will fully flatten to position $A_8$ only if it was a "one" at position $A_3$ at the start. De-energization of latching electrode $H_2$ will allow the addressed element to return to position $A_3$ if it did uncurl.

A Second Embodiment

Figure 2:
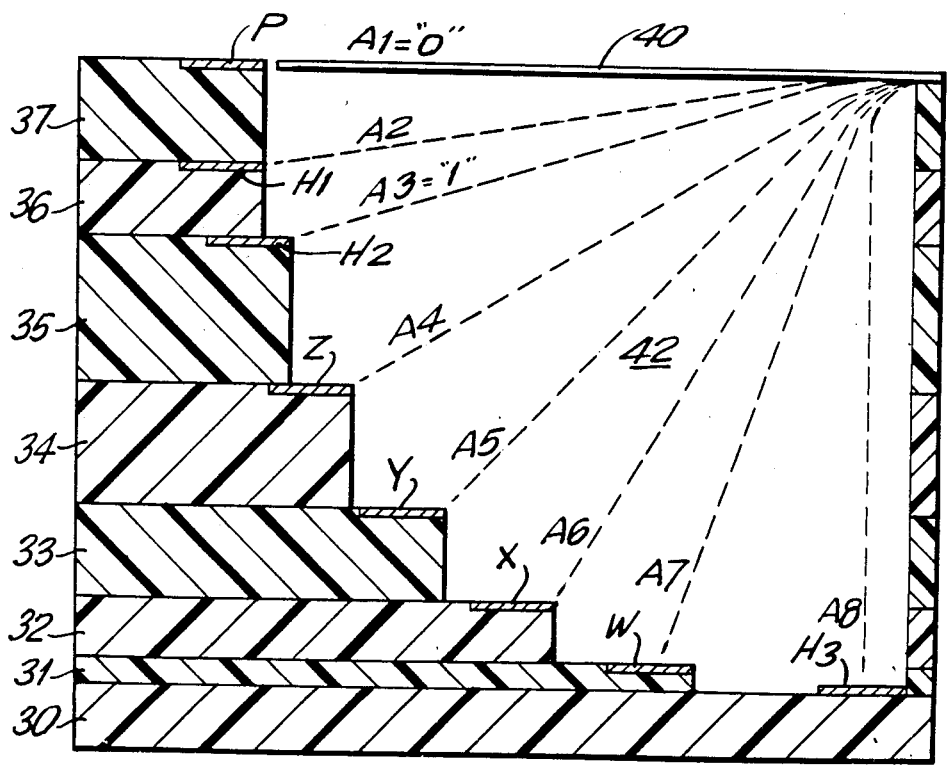
FIG. 2 is a view in cross-section of an electrostatically actuated binary element of a random access memory array according to a second embodiment.

FIG. 2 is a cross-sectional view of a further embodiment which differs in structure, but is similar in operation to that of FIG. 1. An electrostatically attractable flexible shutter or flap 40 swings toward electrode areas P, H1, H2, Z, Y, X, W, and H3 which are located on a plurality of laminae 30-36. The laminae provided with apertures of graduated widths which, when aligned, form a stepsided cavity 42 in which the flap 40 swings. The electrode areas are arranged near the edge of the apertures to be proximate the free edge of the flap 40. Our U.S. application Ser. No. 819,918 discloses a similar structure and is hereby incorporated by reference. The flap 40 may be a thin polymeric film (PET) having a vacuum deposited metalized surface. The flap is secured to the upper right hand edge of the cavity 42. The flap 40 is shown in a horizontal position A1 in FIG. 2, attracted and retained by the preliminary electrode P. This position represents the binary digit "zero". Position A3 represents the binary digit "one". The flap is moved progressively from A1 through A8 by sequential energization of the electrode areas by appropriate addressing. Operation of this embodiment is similar to that described for the embodiment of FIG. 1.

To store information in the array, all elements are sequentially driven to position A8 and held there by electrode H3. To place a flap(s) in position A1 representative of "zero" the address electrodes for that element(s) is energized as are, for all elements, electrodes H1, H2, and P. All W electrodes are energized and all H3 are de-energized. All flaps move to position A7. Sequentially de-energizing the address coordinate elements of the chosen element(s) will cause the chosen flap to be driven to A3. Sequentially de-energizing H2 and H1 will place the chosen flap(s) at A1 where it represents "zero". Once all elements chosen to be "zero" have been moved, all others are driven to position A3 where they represent "one" by sequentially de-energizing all W, X, Y, and Z electrodes. The elements are retained in proper position by H2 or P.

Whether a particular element represents a "zero" or a "one" can be ascertained (read) by coordinate addressing of the Z, Y, X, and W electrodes for that element. The flap will be held in position A8 by the H3 electrode only if initially it was in position A3 (representing "one"). If initially it was in position A1 (representing "zero"), it could not be moved to position A4 because it was too remote. Thus, the presence of a flap at A8 indicates that the element represents "one". By forming the bottom layer 30 and electrode H3 from translucent materials and the other laminae and flap of opaque materials, light will pass through an element when the flap is in position A8 for sensing purposes.

We claim:

1. A random access memory array comprising a plurality of electrostatically actuated binary devices, each device being discretely addressable to actuate the device to change position between either of two states representative of first and second binary digits, and each device being discretely addressable to ascertain which of the states it is in.

2. A random access memory array comprising a plurality of electrostatically actuated binary devices, each device comprising an electrostatically attractable member moveable with respect to a stator member between two positional states representative of first and second binary digits, and a plurality of electrostatic electrode regions arranged to drive the moveable member between the two states and to hold the moveable member in either state.

3. A random access memory array comprising a plurality of electrostatically actuated binary devices, each device comprising a stator member and an electrostatically attractable member moveable with respect to the stator member between two positional states representative of first and second binary digits, and a plurality of electrostatic electrode regions arranged to move the moveable member, certain of the electrode regions constituting coordinates of a discrete address for each device of the array, and others of the electrode regions constituting electrodes for latching the moveable member in one of the two states.

4. The array of claim 3 wherein the stator member includes the electrode regions.

5. The array of claim 4 wherein the moveable member of each device is in the form of a curl which, when sequentially electrostatically attracted by the electrode regions, progressively uncurls to overlie the stator member, and when not attracted, re-curls.

6. The array of claim 5 wherein the electrode regions comprise, in the direction of uncurling, a preliminary electrode, a first latching electrode, a plurality of electrodes each representative of a coordinate of the discrete address of the device, and a second latching electrode.

7. The array of claim 4 wherein the moveable member of each device is in the form of a flap which, when sequentially electrostatically attracted by the electrode regions, progressively swings to change position.

8. A random access memory array comprising a plurality of electrostatically actuated binary devices, each device comprising a stator member and an electrostatically attractable member moveable with respect to the stator member in a first direction by electrostatic force and in the second, opposite direction by a restorative force, the moveable member having two positional states representative of first and second binary digits, and a plurality of electrostatic electrode regions arranged to move the moveable member in the first direction, the electrode regions comprising a preliminary electrode, a first latching electrode, a plurality of electrodes each representative of a coordinate of a discrete address for each device within the array, and a second latching electrode.

9. A random access memory array comprising a plurality of electrostatically actuated binary devices, each device comprising an assembly of multiple layers, the layers having apertures in alignment to form a cavity, a moveable member in the form of a hinged flap, the apertures being graduated in width to approximate the arcuate path of the edge of the flap, and a plurality of electrostatic electrodes located among the layers and positional proximate the margins of the apertures, the moveable member being electrostatically attractable by the electrodes and having two positional states representative of first and second binary digits.

10. A method of storing information in the form of first and second binary digits in an electrostatically actuated random access memory array, each element of the array having an electrostatically moveable member and a stator member having, in sequential order, a preliminary electrode, a first latching electrode, a plurality of electrodes each representative of a coordinate of a discrete address for each device within the array, and a second latching electrode, the method comprising the steps of:
   energizing all electrodes of the array to move the moveable members of all elements of the array fully in a first direction,
   de-energizing the second latching electrodes of all elements,
   for each device chosen to represent the first binary digit, de-energizing the electrodes representative of the address coordinates for each chosen element,
   de-energizing the first latching electrode and the preliminary electrode, whereby all chosen elements move fully in a second direction to the position state representative of the first binary digit,
   energizing the first latching electrode for all elements,
   de-energizing all other electrodes of the array, whereby all devices not in the position state representative of the first binary digit move in the second direction to a position state representative of the second binary digit, where they are held by the first latching electrode.

11. A method of retrieving information stored in a random access memory array in the form of positional states representative of first and second binary digits, each element of the array having an electrostatically movable member and a stator member having, in sequential order, a preliminary electrode, a first latching electrode, a plurality of electrodes each representative of a coordinate of a discrete address for each device within the array, and a second latching electrode, comprising the steps of:
   for each element of the array to be interrogated about its positional status, energizing the electrodes representative of the coordinates of the address of that element,
   ascertaining whether that element has been fully moved by the address electrodes,
   whereby that element was in the state representative of the second binary digit if it has been fully moved, and was in the state representative of the first binary digit if it has not been fully moved.

12. A random access memory array of electrostatically actuated elements, each element comprising a member moveable by electrostatic force with respect to a stator between positions representative of first and second binary digits, and stator electrodes comprising one electrode for each of the two positional states separated by an intervening electrode, electrodes representative of the coordinates of a discrete address for each element, and a latching electrode subsequent to the address electrodes.

13. A method of storing information in the form of first and second binary digits in an electrostatically actuated random access memory array, each element of the array having an electrostatically movable member and a stator member having, in sequential order, a preliminary electrode, a first latching electrode, a plurality of electrodes each representative of a coordinate of a discrete address for each device within the array, and a second latching electrode, the method comprising the steps of:
   for all elements in the array, energizing the preliminary and first latching electrodes,
   for all elements chosen to represent the second binary digit, energizing the electrodes representative of the address coordinates of the chosen elements to move the movable members of the chosen elements in a first direction and energizing the second latching electrode,
   de-energizing the preliminary and first latching electrodes, whereby all devices not held by the second latching electrode move fully in a second direction to a position representative of the first binary digit,
   energizing the first latching electrode, and de-energizing the second latching electrode and all address coordinate electrodes whereby all addressed devices move in the second direction to a position state representative of the second binary digit, where they are held by the first latching electrode.

14. The method of claim 11 wherein the second latching electrodes are energized to latch those elements which fully moved in response to energization of the address coordinates.

15. The method of claim 11 wherein the full movement of an element is ascertained by cycling the electrode nearest the end of the direction of movement to cause the movable member to flutter at the frequency that the electrode is cycled, and photoelectrically detecting the presence or absence of flutter.

* * * * *